United States Patent
Bennett, III et al.

(10) Patent No.: US 8,155,296 B2
(45) Date of Patent: *Apr. 10, 2012

(54) METHOD, SYSTEM, AND ARTICLE FOR AUDIBLY IDENTIFYING A CALLED PARTY

(75) Inventors: Raymond Walden Bennett, III, Naperville, IL (US); Robert Wesley Bossemeyer, Jr., St. Charles, IL (US); Gayle Roberta Ekstrom, Chicago, IL (US); Laura Marie Griffith, Dundee, IL (US); Edmond W. Israelski, Lake Barrington, IL (US); Denise Violetta Kagan, Riverwoods, IL (US); Richard Peter Krupka, Barrington, IL (US); Donald Bernard Liebrecht, West Dundee, IL (US); Jordan Howard Light, Chicago, IL (US); Karen Jeanne Pelletier, Crystal Lake, IL (US); Michael Steven Pickard, Highland Park, IL (US); Bruce Edward Stuckman, Algonquin, IL (US); Barry James Sullivan, Long Grove, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 725 days.

This patent is subject to a terminal disclaimer.

(21) Appl. No.: 12/268,880

(22) Filed: Nov. 11, 2008

(65) Prior Publication Data

US 2009/0074170 A1    Mar. 19, 2009

Related U.S. Application Data

(63) Continuation of application No. 11/784,480, filed on Apr. 6, 2007, now Pat. No. 7,450,707, which is a continuation of application No. 10/223,063, filed on Aug. 16, 2002, now Pat. No. 7,218,717, which is a continuation of application No. 09/293,166, filed on Apr. 16, 1999, now Pat. No. 6,463,143.

(51) Int. Cl.
  *H04M 3/42* (2006.01)
  *H04M 1/64* (2006.01)
  *H04M 11/00* (2006.01)

(52) U.S. Cl. ........... 379/207.14; 379/88.16; 379/142.01; 379/207.02; 379/218.01; 379/230

(58) Field of Classification Search ............. 379/142.01, 379/142.07, 207.02, 207.14, 218.01, 230, 379/88.16
  See application file for complete search history.

(56) References Cited

U.S. PATENT DOCUMENTS

| | | | |
|---|---|---|---|
| 4,734,931 A | | 3/1988 | Bourg et al. |
| 4,922,526 A | | 5/1990 | Morganstain et al. |
| 4,924,496 A | | 5/1990 | Figa et al. |
| 5,119,415 A | * | 6/1992 | Aoyama ................. 379/230 |
| 5,544,235 A | | 8/1996 | Ardon |
| 5,608,788 A | * | 3/1997 | Demlow et al. .......... 379/142.07 |
| 5,652,789 A | | 7/1997 | Miner et al. |
| 5,734,706 A | | 3/1998 | Windsor et al. |
| 5,852,657 A | | 12/1998 | Malik et al. |

(Continued)

*Primary Examiner* — Gerald Gauthier
(74) *Attorney, Agent, or Firm* — Cantor Colburn LLP

(57) ABSTRACT

A dialed number of a called party is received from a calling party. Based on the dialed number, a name of the called party is retrieved from a database. An audio message which includes the name of the called party is generated and communicated to the calling party. A call is routed between the calling party and the called party after said communicating the audio message.

4 Claims, 2 Drawing Sheets

U.S. PATENT DOCUMENTS

| | | | |
|---|---|---|---|
| 5,875,240 A * | 2/1999 | Silverman | 379/142.07 |
| 5,889,848 A | 3/1999 | Cookson | |
| 5,970,133 A | 10/1999 | Salimando | |
| 6,289,090 B1 * | 9/2001 | Tessler et al. | 379/207.02 |
| 6,463,143 B2 * | 10/2002 | Bennett et al. | 379/207.14 |
| 7,010,111 B1 * | 3/2006 | Blackburn et al. | 379/207.14 |
| 7,046,785 B2 * | 5/2006 | Sweeney et al. | 379/218.01 |
| 7,149,301 B2 * | 12/2006 | Yoshida et al. | 379/218.01 |
| 7,215,749 B1 * | 5/2007 | Liebenow | 379/142.01 |
| 7,218,717 B2 * | 5/2007 | Bennett et al. | 379/207.14 |
| 7,450,707 B2 * | 11/2008 | Bennett et al. | 379/207.14 |
| 2001/0043682 A1 * | 11/2001 | Bennett et al. | 379/88.16 |
| 2003/0112950 A1 * | 6/2003 | Bennett et al. | 379/207.14 |
| 2008/0031438 A1 * | 2/2008 | Bennett et al. | 379/207.14 |
| 2009/0074170 A1 * | 3/2009 | Bennett et al. | 379/207.14 |

\* cited by examiner

METHOD, SYSTEM, AND ARTICLE FOR AUDIBLY IDENTIFYING A CALLED PARTY

RELATED APPLICATIONS

The present patent document is a continuation of application Ser. No. 11/784,480, filed Apr. 6, 2007, now U.S. Pat. No. 7,450,707 which is a continuation of application Ser. No. 10/223,063 filed Aug. 16, 2002, now U.S. Pat. No. 7,218,717, which is a continuation of application Ser. No. 09/293,166, filed Apr. 16, 1999, now U.S. Pat. No. 6,463,143. All of the foregoing applications are hereby incorporated herein by reference.

BACKGROUND

1. Technical Field

The present invention relates to methods, systems, and articles for audibly identifying a called party.

2. Background of the Invention

Traditional caller identification services allow a called party to identify a calling party of an incoming call. For outgoing calls, however, the called party is identified once the called party has been reached. A caller determines that he/she has misdialed a telephone number after being informed of same by an unintended called party.

Some private branch exchange (PBX) configurations allow caller identification information to be displayed in relation to an outgoing call if the outgoing call is to another line of the PBX. Business callers use this feature to determine if they have dialed a correct number before the call is placed or answered.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
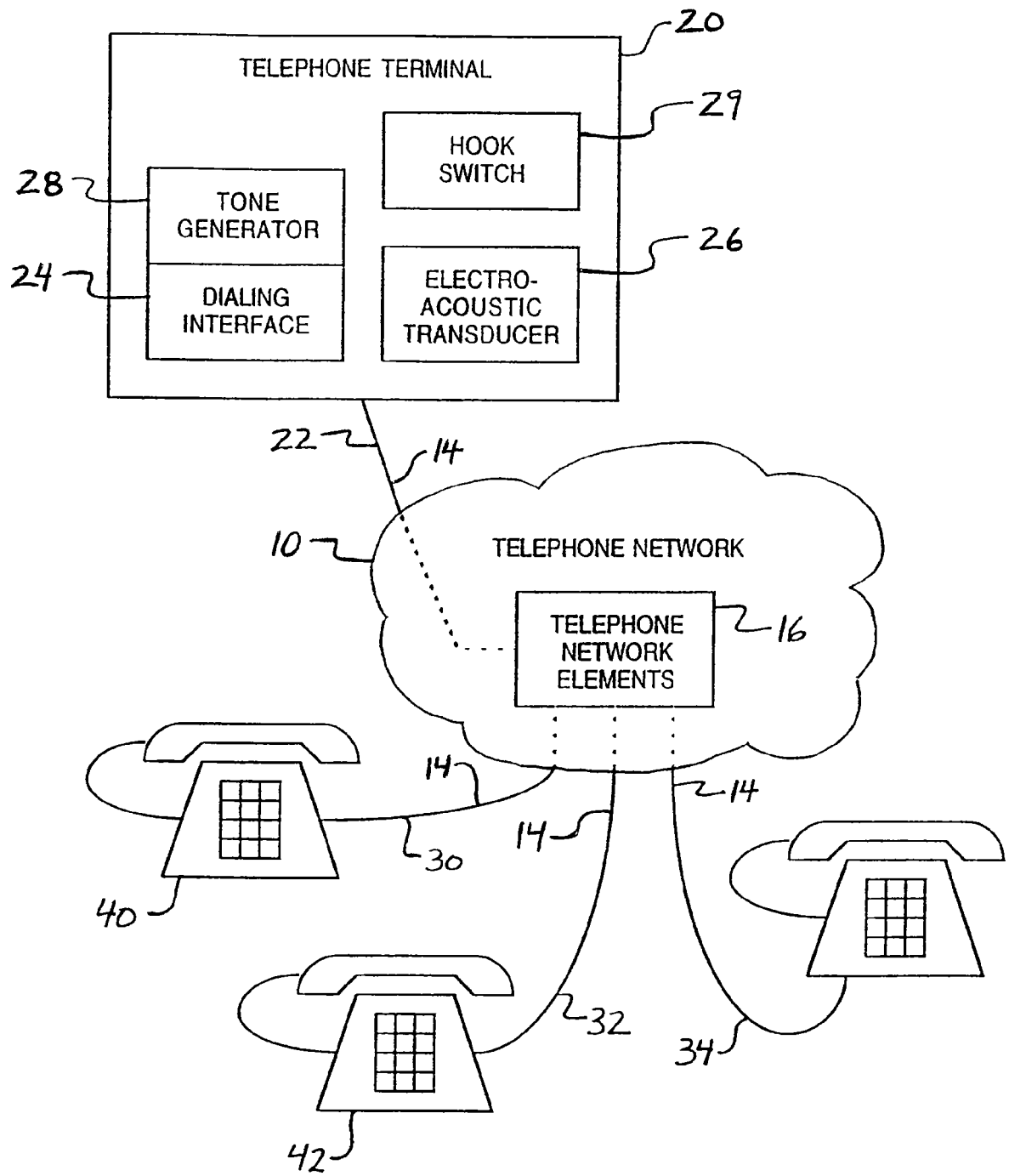
FIG. 1 is a schematic/block diagram of an embodiment of a system for audibly identifying a called party.
Figure 2:
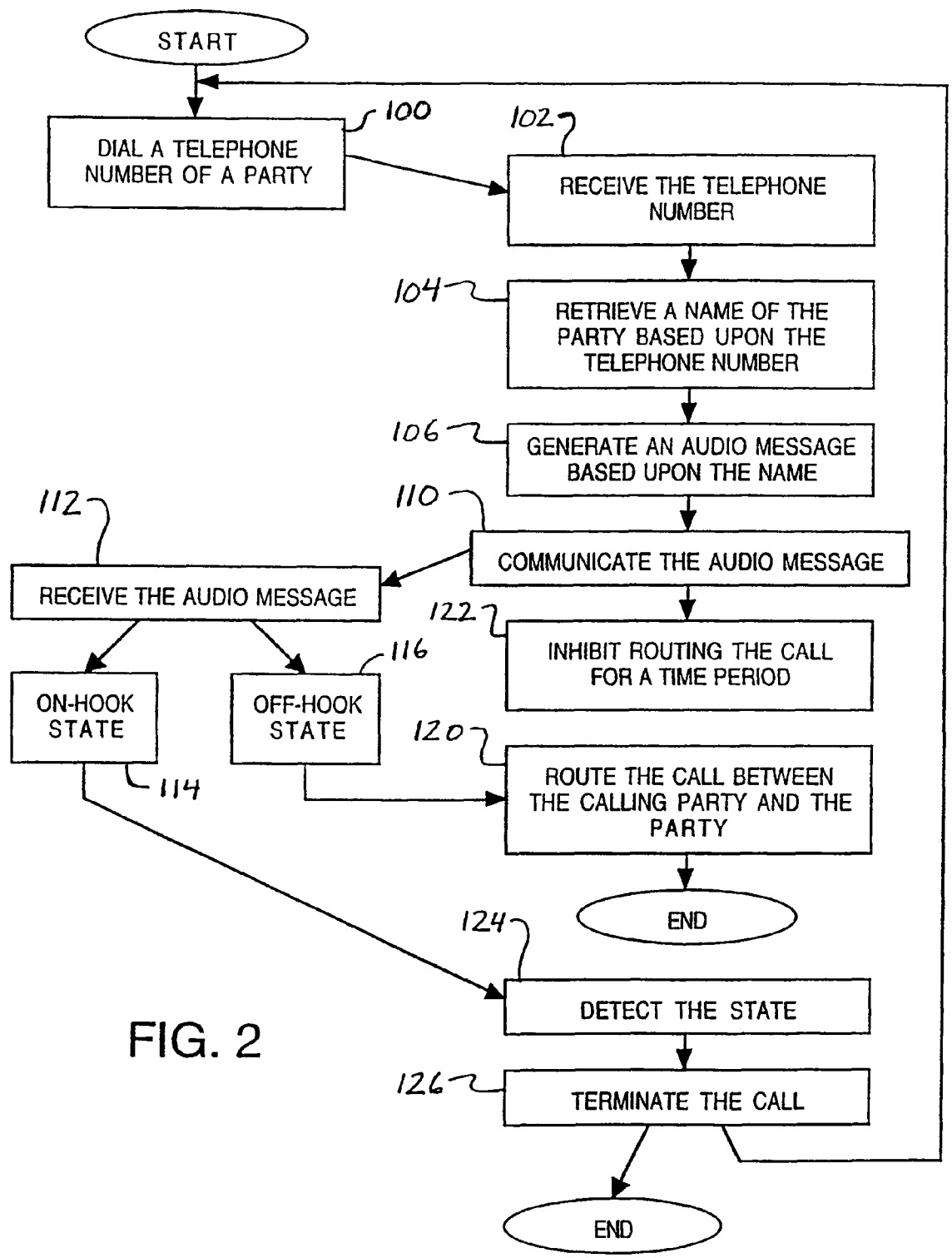
FIG. 2 is a flow chart of an embodiment of a method of audibly identifying a called party.

The present invention provides an improved telephone service for audibly identifying a called party. Description of embodiments of the telephone service is made with reference to both FIG. 1, which shows a schematic/block diagram of an embodiment of a system for audibly identifying the called party, and FIG. 2, which shows a flow chart of an embodiment of a method of audibly identifying the called party.

The telephone service is provided in conjunction with a public telephone network 10. The public telephone network 10, such as a public switched telephone network, serves a plurality of telephone parties. In a landline telephone network, for example, the public telephone network 10 provides a plurality of telephone lines 14 to serve the telephone parties. Each of the telephone parties and/or telephone lines 14 has a unique identifier associated therewith. In the landline telephone network, for example, each of the telephone lines 14 is identified by an associated calling party identification code or an automatic network interface (ANI) code.

The system comprises one or more telephone network elements 16 which cooperate to provide the telephone service for audibly identifying the called party. Examples of the one or more telephone network elements 16 include, but are not limited to, a service switching point, a service control point, a line information database, a caller name database and/or another database, an intelligent peripheral, other advanced intelligent network (AIN) network elements, and combinations thereof. Based upon the herein-disclosed high-level description and flow chart, one or more computer programs, such as service scripts, to direct the telephone network elements 16 to cooperate in providing the service logic are within the skill of a routineer in the art of telecommunications.

As indicated by block 100, a telephone number of a called party is dialed by a calling party. For purposes of illustration and example, the telephone number is dialed by an end user using a telephone terminal 20 connected to a telephone line 22. Examples of the telephone terminal 20 include, but are not limited to, a telephone set, a facsimile machine, and a computer having a modem.

Regardless of its specific form, the telephone terminal 20 comprises a dialing interface 24 and an electroacoustic transducer 26. Preferably, the dialing interface 24 comprises a standard telephone keypad having dialing digit keys of "0" to "9", a "*" key, and a "#" key. A tone generator 28 is responsive to the telephone keypad to generate dual-tone multi-frequency (DTMF) signals. Signals generated by the tone generator 28 are applied to the telephone line 22. The electroacoustic transducer 26 may comprise a speaker to generate audible acoustic pressure waves based upon signals received from the telephone line 22.

The telephone terminal 20 also comprises a hook switch 29. The hook switch 29 is used to place the telephone terminal 20 in either an on-hook state or an off-hook state.

Using a landline telephone set, for example, the end user can take the telephone off-hook (e.g. by picking up a handset) and dial the telephone number using the standard telephone keypad.

As indicated by block 102, the telephone number dialed by the calling party is received by one of the telephone network elements 16. Typically, the aforementioned telephone network element includes a switch within the public telephone network 10, such as a service switching point at a central office which serves the calling party.

As indicated by block 104, a name of the called party is retrieved from a database. The name of the called party is retrieved from the database based upon the dialed number received in block 102. The database may include a caller name (CNAM) database having a plurality of party names or state names, each of which is associated with a corresponding number. The name of the called party may be retrieved by a service control point or another of the telephone network elements 16.

For purposes of illustration and example, consider the database to comprise computer-readable data for parties having telephone lines denoted by reference numerals 30, 32, and 34. The telephone line 30 is associated with a fictitious individual named Jane Doe having a fictitious telephone number of 847/555-0120. The telephone line 32 is associated with a fictitious individual named John Smith having a fictitious telephone number of 847/555-0121. The telephone line 34 is associated with a fictitious individual named John Doe having a fictitious telephone number of 847/555-0147. Hence, the database comprises first data which associates the number 847/555-0120 with the name Jane Doe, second data which associates the number 847/555-0121 with the name John Smith, and third data which associates the number 847/555-0147 with the name John Doe.

As indicated by block 106, an audio message is generated based upon the name of the called party. The audio message may be generated by an intelligent peripheral or another of the telephone network elements 16 capable of speech synthesis and/or speech playback. Preferably, the audio message includes verbal or spoken information indicating the name of the called party.

Continuing with the above example, if the calling party dialed 847/555-0120, the audio message may comprise "dialing Jane Doe." If the calling party dialed 847/555-0121, the audio message may comprise "dialing John Smith." If the calling party dialed 847/555-0147, the audio message may comprise "dialing John Doe."

Optionally, the audio message further includes the dialed number. For example, if the calling party dialed 847/555-0120, the audio message may comprise "dialing Jane Doe at 847/555-0120."

As indicated by block 110, the audio message is communicated to the calling party. The audio message is communicated via the public telephone network 10 to the telephone line 22. The audio message may be communicated from the intelligent peripheral to the telephone line 22 via the service switching point which serves the telephone line 22. Preferably, the audio message is communicated to the calling party before the call is routed to the called party.

As indicated by block 112, the audio message is received by the calling party. The audio message is received by the telephone terminal 20 via the telephone line 22. The audio message is made audible to the end user by the electroacoustic transducer 26 of the telephone terminal 20. Preferably, the audio message is received and made audible before the call is routed to the called party.

Based on the audio message, the calling party may choose either to terminate the call, as indicated by block 114, or to continue with the call, as indicated by block 116. To terminate the call, the calling party may hang-up the telephone terminal 20 or otherwise return the telephone terminal 20 to an on-hook state. To continue with the call, the calling party maintains the telephone terminal 20 in the off-hook state.

If the telephone terminal 20 is maintained in the off-hook state, the call is routed between the calling party and the called party, as indicated by block 120. Optionally, a delay period is provided between communicating the audio message and routing the call, as indicated by block 122. This gives the calling party a time period to terminate the call before the call is routed.

If the telephone terminal 20 is maintained in the off-hook state throughout the delay period (i.e. an absence of an on-hook state is determined throughout the delay period), the call is routed to the called party after the delay period. If the telephone terminal 20 is returned to the on-hook state before the end of the delay period, the call is not routed to the called party. In particular, the on-hook state is detected by one of the telephone network elements 16, as indicated by block 124, and the call is terminated based on said detecting, as indicated by block 126.

Continuing with the above example, consider that the calling party wishes to call John Smith at 847/555-0121. Further consider that the calling party initially misdials the last digit of John Smith's number by dialing 847/555-0120 using the dialing interface 24. In this case, the calling party receives an audio message such as "dialing Jane Doe" which is made audible by the electroacoustic transducer 26.

Based on the audio message, the calling party may determine that he/she has misdialed John Smith's number, and may choose to terminate the call by placing the telephone terminal 20 in an on-hook state. The calling party can terminate the call before the call is routed to the telephone line 30 of Jane Doe. By terminating the call in this manner, a telephone 40 coupled to the telephone line 30 does not ring.

Thereafter, the calling party may place the telephone terminal 20 in an off-hook state and reattempt to dial John Smith. Consider that the calling party correctly dials 847/555-0121 in this attempt. In this case, the calling party receives an audio message such as "dialing John Smith" which is made audible by the electroacoustic transducer 26. Based on the audio message, the calling party may determine that he/she has correctly dialed John Smith's number, and may choose to continue with the call by performing no acts with the hook switch 29.

After the delay period, the call is routed to the telephone line 32. A telephone 42 coupled to the telephone line 32 rings based on the call. John Smith or another person may answer the call using the telephone 42 to communicate with the calling party.

As stated earlier, providing service logic to direct the telephone network elements 16 to cooperate as described herein is within the skill of a routineer in the art of telecommunications. For example, a service switching point which serves the telephone line 22 may communicate a query message to a service control point or another telephone network element. The query message may include the number dialed by the calling party. Based on the query message, the service control point may communicate a reply message back to the service switching point. The reply message may include the called party name or state name, and call-handling instructions specific to the telephone service. The service switching point may handle the call based on the call-handling instructions. These call-handling instructions may include the service switching point employing an intelligent peripheral or another network element capable of providing an audio representation of the called party name or state name.

Embodiments of the herein-disclosed methods may be directed by computer-readable instructions encoded on a computer-readable medium. The contents of the computer-readable medium cause the one or more network elements 16 to perform the herein-disclosed acts. For this purpose, at least one computer processor associated with the one or more telephone network elements 16 is responsive to the contents of the computer-readable medium.

Examples of the computer-readable medium include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions.

Thus, there has been described herein several embodiments including preferred embodiments of method, system, and article for audibly identifying a called party.

By communicating a herein-disclosed audio message to the calling party, the calling party has an opportunity to terminate a misdialed call either before the called party's telephone has rung or before the called party has answered the call. By routing a call in the absence of any post-audio-message input received from the calling party, the service requires no additional user actions for correctly-dialed calls.

It will be apparent to those skilled in the art that the disclosed invention may be modified in numerous ways and may assume many embodiments other than the preferred form specifically set out and described above. For example, either in addition to or as an alternative to audibly presenting the name of the called party, a visible representation of the name may be provided to the calling party. The visible representation of the list may be provided using a caller-identification display unit coupled to the telephone line 22.

Although described for use with a wireline telephone network, embodiments of the telephone service also may be used in conjunction with a wireless telephone network. Further, although described for use with the public telephone network 10, embodiments of the present invention may be used in conjunction with a private telephone network.

Accordingly, it is intended by the appended claims to cover all modifications of the invention which fall within the true spirit and scope of the invention.

The invention claimed is:

1. A method comprising:
  receiving, from a calling party, a misdialed number from the calling party;
  in response to receipt of the misdialed number, generating a dialed number query which includes information about the misdialed number from the calling party;
  communicating the dialed number query to a network element;
  using the network element to retrieve from a database information about a name of a party having the misdialed number based on the information about the misdialed number in the dialed number query;
  generating a misdialed number reply which includes information about the name of the party having the misdialed number;
  in response to the misdialed number reply, generating audio information which includes the name of the party having the misdialed number; and
  communicating the audio information to the calling party.

2. The method of claim 1 further comprising:
  inhibiting routing a call to the party having the misdialed number for a first time period;
  detecting an on-hook state from the calling party during the first time period;
  after detecting the on-hook state, terminating the call to the party having the misdialed number.

3. The method of claim 2 further comprising:
  subsequently receiving from the calling party a correctly dialed number of the called party;
  in response, generating a dialed number query which includes information about the correctly dialed number of the called party;
  communicating the dialed number query to a network element;
  using the network element to retrieve from a database information about a name of the called party based on the information about the correctly dialed number in the dialed number query;
  generating a dialed number reply which includes information about the name of the called party;
  in response to the dialed number reply, generating audio information which includes the name of the called party; and
  communicating the audio information which includes the name of the called party to the calling party;
  determining an absence of an on-hook state from the calling party during a second time period after said communicating the audio message which includes the name of the called party; and
  routing a call between the calling party and the called party after the second time period.

4. The method of claim 3 further comprising:
  determining an absence of an on-hook state from the calling party during a second time period after communicating the audio information which includes the name of the called party; and
  routing a call between the calling party and the called party after the second time period.

* * * * *